US012656979B2

(12) United States Patent
Lee

(10) Patent No.: US 12,656,979 B2
(45) Date of Patent: Jun. 16, 2026

(54) STORAGE DEVICE FOR ADAPTIVELY DETERMINING SCHEME OF WRITING DATA UNITS, AND OPERATING METHOD THEREOF

(71) Applicant: SK hynix Inc., Gyeonggi-do (KR)

(72) Inventor: Joo Young Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/906,179

(22) Filed: Oct. 4, 2024

(65) Prior Publication Data

US 2025/0370657 A1     Dec. 4, 2025

(30) Foreign Application Priority Data

Jun. 4, 2024     (KR) ........................ 10-2024-0072753

(51) Int. Cl.
| | |
|---|---|
| *G06F 3/00* | (2006.01) |
| *G06F 3/06* | (2006.01) |
| *G06F 12/00* | (2006.01) |

(52) U.S. Cl.
CPC .......... *G06F 3/0659* (2013.01); *G06F 3/0604* (2013.01); *G06F 3/0673* (2013.01)

(58) Field of Classification Search
CPC ..... G06F 3/0659; G06F 3/0604; G06F 3/0673
USPC ........................................................ 711/154
See application file for complete search history.

(56) References Cited

U.S. PATENT DOCUMENTS

| | | | | | |
|---|---|---|---|---|---|
| 6,055,247 | A * | 4/2000 | Kubota | ............... | H04L 12/6418 |
| | | | | | 348/E5.014 |
| 8,762,916 | B1 * | 6/2014 | Kathail | ................... | G06F 30/30 |
| | | | | | 326/38 |
| 10,860,475 | B1 * | 12/2020 | Coleman | ............... | G06F 3/0688 |
| 11,275,681 | B1 * | 3/2022 | Coleman | ............... | G06F 3/0688 |
| 11,741,003 | B2 * | 8/2023 | Coleman | ................ | G06F 3/061 |
| | | | | | 711/103 |
| 12,099,441 | B2 * | 9/2024 | Coleman | ............... | G06F 3/0688 |
| 2013/0166825 | A1 * | 6/2013 | Kim | .................... | G06F 12/0246 |
| | | | | | 711/E12.008 |
| 2015/0074367 | A1 * | 3/2015 | Cher | ..................... | G06F 11/008 |
| | | | | | 711/165 |
| 2015/0163042 | A1 * | 6/2015 | Tsuda | .................... | H04L 5/0058 |
| | | | | | 370/329 |
| 2016/0070971 | A1 * | 3/2016 | Nakashima | ............... | G06T 7/74 |
| | | | | | 348/87 |
| 2016/0093345 | A1 * | 3/2016 | Chun | ................. | G06F 13/1689 |
| | | | | | 711/105 |
| 2018/0048549 | A1 * | 2/2018 | Edwards | ............. | H04L 43/0852 |
| 2019/0234752 | A1 * | 8/2019 | Volos | ................. | G01C 21/3453 |
| 2019/0238436 | A1 * | 8/2019 | Volos | ........................ | G06N 7/01 |
| 2020/0167190 | A1 * | 5/2020 | Bernat | .................. | G06F 9/4881 |

(Continued)

FOREIGN PATENT DOCUMENTS

| | | |
|---|---|---|
| KR | 10-2015-0102030 A | 9/2015 |
| KR | 10-2020-0032921 A | 3/2020 |

*Primary Examiner* — Sheng Jen Tsai
(74) *Attorney, Agent, or Firm* — IP & T GROUP LLP

(57) ABSTRACT

A storage device may include a memory and a controller. The memory includes M memory dies, each die including a plurality of memory blocks, each block including a plurality of memory cells, each cell storing K bits of data. The controller may receive M*K data units from a host, may calculate a first time taken to receive the M*K data units, and may determine a scheme of storing the M*K data units in the memory based on the first time.

8 Claims, 9 Drawing Sheets

METHOD_1

METHOD_2

(56) References Cited

U.S. PATENT DOCUMENTS

| | | | |
|---|---|---|---|
| 2021/0011642 A1* | 1/2021 | Lee | G06F 12/0253 |
| 2021/0405908 A1* | 12/2021 | Bassett | G06F 3/0619 |
| 2022/0164281 A1* | 5/2022 | Coleman | G06F 3/0647 |
| 2024/0020227 A1* | 1/2024 | Coleman | G06F 12/0246 |
| 2024/0419587 A1* | 12/2024 | Coleman | G06F 3/0647 |
| 2025/0246218 A1* | 7/2025 | Lee | G11C 7/222 |

* cited by examiner

CELL (K bits)

determine reference time based on at least one of T2 & M

*FIG.7*

*METHOD_1*

METHOD_2

Receive M*K data units    ~S910

Calculate first time required for
operation of receiving data units    ~S920

Determine method of storing data units
in memory on the basis of first time    ~S930

STORAGE DEVICE FOR ADAPTIVELY DETERMINING SCHEME OF WRITING DATA UNITS, AND OPERATING METHOD THEREOF

CROSS-REFERENCE TO RELATED APPLICATION

The present application claims priority under 35 U.S.C. § 119 (a) to Korean Patent Application No. 10-2024-0072753 filed on Jun. 4, 2024, which is incorporated herein by reference in its entirety.

BACKGROUND

1. Technical Field

Embodiments of the present disclosure relate to a storage device which adaptively determines a method (or scheme) of writing data units, and an operating method thereof.

2. Related Art

A storage device is a device for storing data according to a request from an external device such as a computer, a mobile terminal (e.g., a smart phone or tablet), or the like.

A storage device may include a memory for storing data therein and a controller for controlling the memory. The memory may be a volatile memory or a non-volatile memory. The controller may receive a command from an external device (i.e., a host), and execute or control operations to read, write, or erase data in the memory included in the storage device according to the received command.

In order to improve read performance, the storage device may sort data after completely receiving all data from the external device, and may write the sorted data to the memory.

However, such a method of sorting data after completely receiving all data and writing the sorted data may cause deterioration in write performance at a specific workload and an increase in delay while writing data.

SUMMARY

Embodiments of the present disclosure are directed to providing a storage device which can minimize deterioration in write performance while writing data by adaptively selecting a method or scheme of writing data, and an operating method thereof.

In an embodiment of the present disclosure, a storage device may include a memory including M memory dies, where M is a natural number of 2 or more, each memory die including a plurality of memory blocks, each memory block including a plurality of memory cells, each memory cell storing K bits of data, where K is a natural number; and a controller configured to receive M*K data units from a host, calculate a first time taken to receive the M*K data units, and determine a scheme of storing the M*K data units in the memory based on the first time.

In another embodiment of the present disclosure, a method for operating a storage device may include receiving M*K data units, where M is a natural number of 2 or more and K is a natural number, from a host; calculating a first time taken to receive the M*K data units; and determining a scheme of storing the M*K data units in a memory based on the first time. The memory includes M memory dies, each memory die including a plurality of memory blocks, each memory block including a plurality of memory cells, each memory cell storing K bits of data.

In another embodiment of the present disclosure, a storage device may include a memory including M memory dies, each memory die including a plurality of memory blocks, each memory block including a plurality of memory cells, each memory cell storing K bits of data; and a controller configured to receive M*K data units, where M is a natural number of 2 or more and K is a natural number, from a host, select one of a simultaneous storing scheme and a sequential storing scheme based on a first time taken to receive the M*K data units, and store the M*K data units in the memory dies based on the selected storing scheme.

According to the embodiments of the present disclosure, by adaptively selecting a method of writing data, it is possible to minimize deterioration in write performance while writing data.

BRIEF DESCRIPTION OF THE DRAWINGS

FIG. 7 is a diagram illustrating an operation in which the storage device according to the embodiments of the present disclosure stores data units according to a first method.

DETAILED DESCRIPTION

Figure 1:
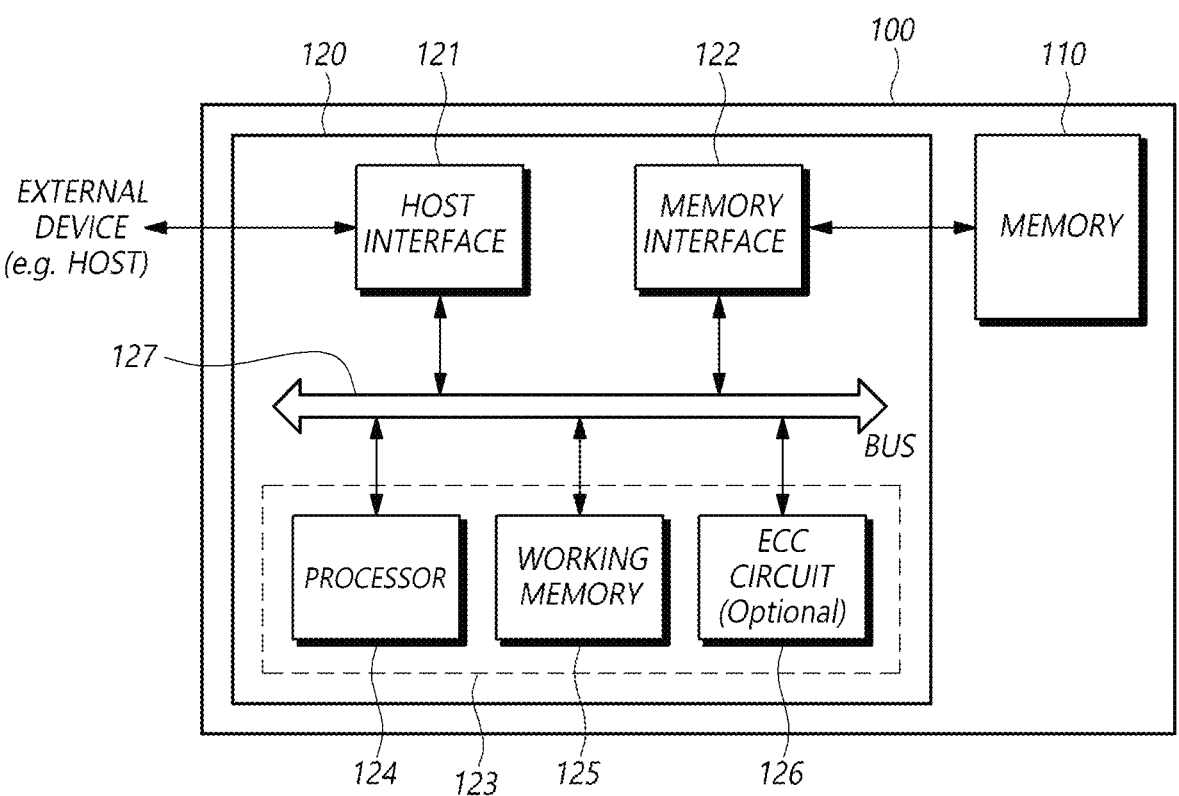
FIG. 1 is a schematic configuration diagram of a storage device according to an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present disclosure are described below in more detail with reference to the accompanying drawings. However, the embodiments of the present disclosure may be in different forms and variations and should not be construed as being limited to the embodiments set forth herein. Rather, the described embodiments are provided so that this disclosure will be thorough and complete, and will fully convey the present disclosure to those skilled in the art to which this disclosure pertains. Throughout this disclosure, like reference numerals refer to like parts throughout the various figures and embodiments of the present disclosure.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device 100 according to an embodiment of the present disclosure.

Referring to FIG. 1, the storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a double data rate synchronous dynamic random access memory (DDR SDRAM), a low power double data rate 4 (LPDDR4) SDRAM, a graphics double data rate (GDDR) SDRAM, a low power DDR (LPDDR), a Rambus dynamic random access memory (RDRAM), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the present disclosure may be applied to a charge trap flash (CTF) in which a charge storage layer is configured by a dielectric layer, and a flash memory in which a charge storage layer is configured by a conductive floating gate.

The memory 110 may receive a command and an address from the controller 120 and may access an area in the memory cell array that is selected by the address. The memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one of a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, a radio frequency identification (RFID) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any of various electronic devices that require the storage device 100 capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various communication standards or interfaces such as a USB (universal serial bus) protocol, an MMC (multimedia card) protocol, a PCI (peripheral component interconnection) protocol, a PCI-e or PCIe (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When a command is received from the host, the control circuit 123 may receive the command through the host interface 121, and may perform an operation of processing the received command.

The memory interface 122 may be coupled with the memory 110 to provide an interface for communication with the memory 110. That is, the memory interface 122 may be configured to provide an interface between the memory 110 and the controller 120 in response to the control of the control circuit 123.

The control circuit 123 performs the general control operations of the controller 120 to control the operation of the memory 110. For instance, the control circuit 123 may include at least one of a processor 124 and a working memory 125, and may optionally include an error detection and correction circuit (ECC circuit) 126.

The processor 124 may control general operations of the controller 120, and may perform a logic operation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer. The flash translation layer may receive the logical block address and translate the logical block address into the physical block address, by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, to control the general operation of the controller 120 and perform a logic operation, the processor 124 may execute (drive) firmware loaded in the working memory 125 upon booting.

Hereafter, an operation of the storage device 100 according to embodiments of the present disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one of a flash translation layer (FTL), a host interface layer (HIL), and a flash interface layer (FIL). The flash translation layer performs a translating function between a logical address requested to the storage device 100 from the host and a physical address of the memory 110. The host interface layer serves to analyze a command requested to the storage device 100 as a storage device from the host and transfer the command to the flash translation layer. The flash interface layer transfers a command, instructed from the flash translation layer, to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic operation, which is defined in the firmware loaded in the working memory 125, to control the general operation of the controller 120. The processor 124 may store a result of performing the logic operation defined in the firmware, in the working memory 125. The processor 124 may control the controller 120 according to a result of performing the logic operation defined in the firmware such that the controller 120 generates a command or a signal. When a part of firmware, in which a logic operation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one of an SRAM (static RAM), a DRAM (dynamic RAM) and an SDRAM (synchronous DRAM). The controller 120 may additionally use a separate volatile memory (e.g. SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate is greater than a reference value, the error detection and correction circuit 126 may determine that a corresponding sector is uncorrectable or a fail. On the other hand, when a bit error rate is less than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
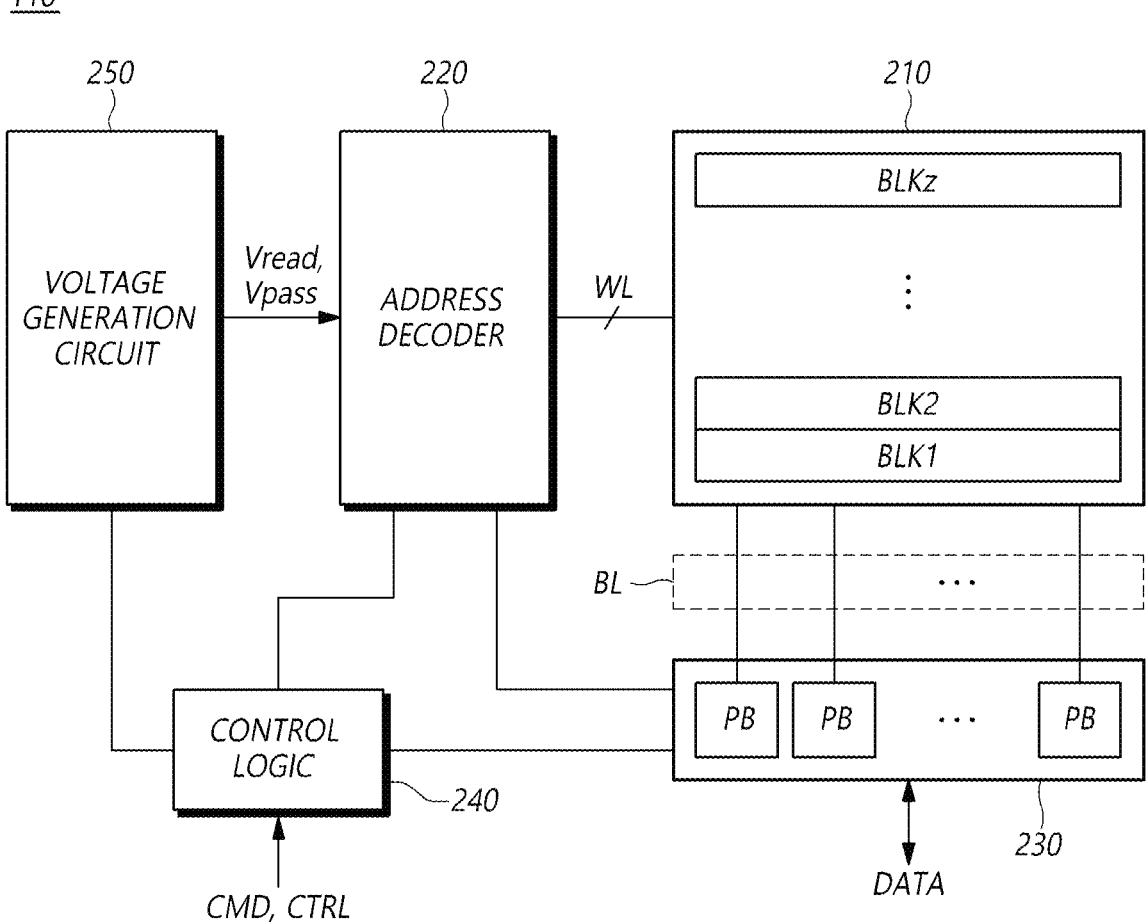
FIG. 2 is a block diagram schematically illustrating a memory of FIG. 1.

FIG. 2 is a block diagram schematically illustrating a memory 110 of FIG. 1.

Referring to FIG. 2, the memory 110 according to an embodiment of the present disclosure may include a memory cell array 210, an address decoder 220, a read and write circuit 230, a control logic 240, and a voltage generation circuit 250.

The memory cell array 210 may include a plurality of memory blocks BLK1 to BLKz, where z is a natural number of 2 or greater.

Each of the plurality of memory blocks BLK1 to BLKz may include a plurality of memory cells disposed between a plurality of word lines WL and a plurality of bit lines BL.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input and output (input/output) buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

During a read operation, the address decoder 220 may apply the read voltage Vread to a selected word line WL in a selected memory block, and may apply the pass voltage Vpass to the remaining unselected word lines WL.

During a program verify operation, the address decoder 220 may apply a verify voltage generated by the voltage generation circuit 250 to a selected word line WL in a selected memory block, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one of a block address, a row address and a column address.

The address decoder 220 may select one memory block and one word line depending on a block address and a row address. A column address may be decoded by the address decoder 220 and be provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. In a read operation and a program verify operation, the plurality of page buffers PB may continuously supply sensing current to bit lines BL coupled with memory cells to sense threshold voltages (Vth) of the memory cells, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. In an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source, and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
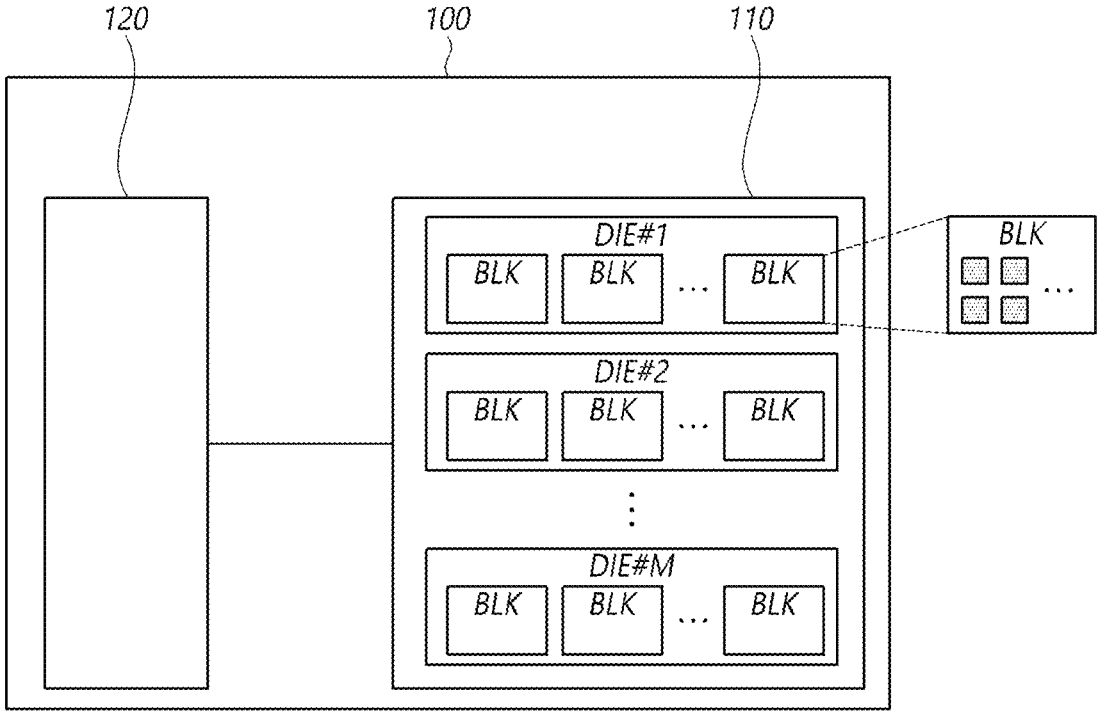
FIG. 3 is a diagram illustrating the schematic structure of a storage device according to embodiments of the present disclosure.

FIG. 3 is a diagram illustrating the schematic structure of a storage device 100 according to embodiments of the present disclosure.

Referring to FIG. 3, the storage device 100 may include a memory 110 and a controller 120.

The memory 110 may include M memory dies DIE #1, DIE #2, . . . , DIE #M, where M is a natural number of 2 or more. Each of the M memory dies DIE #1, DIE #2, . . . , DIE #M may include a plurality of memory blocks BLK. Each memory block BLK may include a plurality of memory cells CELL.

Each memory cell CELL may store K bits of data, where K is a natural number. For example, each memory cell CELL may be a single-level cell (SLC) which stores 1 bit of data. For another example, each memory cell CELL may be a multi-level cell (MLC) which stores 2 bits of data. For still another example, each memory cell CELL may be a triple-level cell (TLC) which stores 3 bits of data. For yet another example, each memory cell CELL may be a quad-level cell (QLC) which stores 4 bits of data.

The controller 120 may control an operation of reading data stored in the memory 110 and an operation of writing data to the memory 110. This will be described in detail with reference to FIG. 4.

Figure 4:
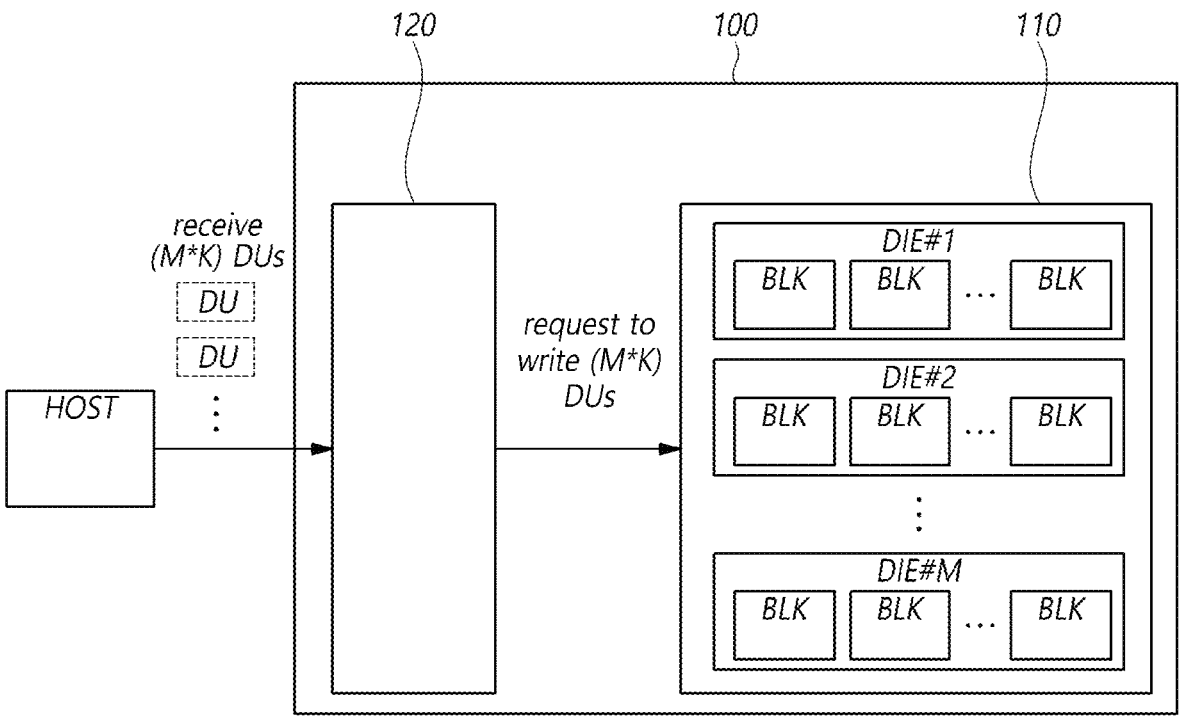
FIG. 4 is a diagram illustrating a schematic operation of the storage device according to the embodiments of the present disclosure.

FIG. 4 is a diagram illustrating a schematic operation of the storage device 100 according to the embodiments of the present disclosure.

Referring to FIG. 4, the controller 120 of the storage device 100 may receive M*K data units DU from a host HOST.

The size of each of the M*K data units DU may be a preset size. For example, the size of each data unit DU may be the page size (e.g., 4 KB, 16 KB or 64 KB) of the memory block BLK included in the memory 110, or may be a multiple of the page size. For another example, the size of each data unit DU may be the size of the memory block BLK included in the memory 110.

The controller 120 may transmit, to the memory 110, a write request for the received M*K data units DU. The memory 110 may write the data units DU received from the controller 120 to the M memory dies DIE #1, DIE #2, . . . , DIE #M.

In the embodiments of the present disclosure, the controller 120 may calculate a first time taken to receive the M*K data units DU. Based on the calculated first time, the controller 120 may determine a method (or scheme) of storing the M*K data units DU in the memory 110. This will be described in detail with reference to FIG. 5.

Figure 5:
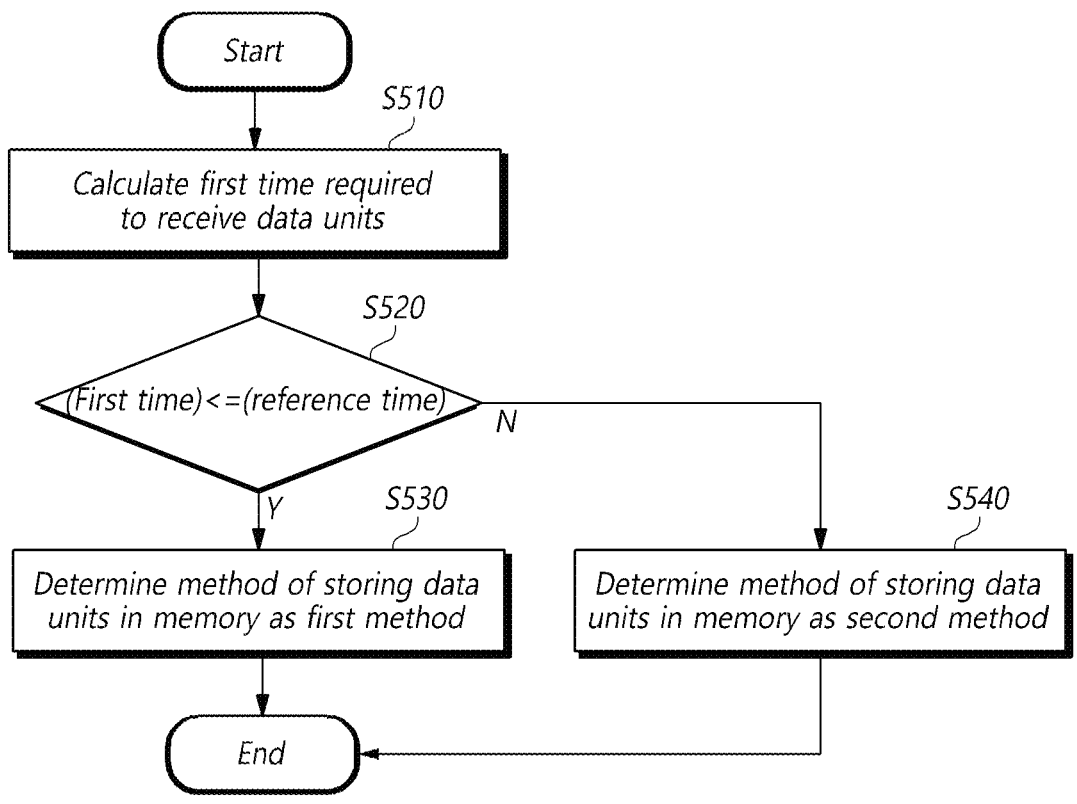
FIG. 5 is a flowchart showing an operation in which the storage device according to the embodiments of the present disclosure adaptively determines a method of writing data units.

FIG. 5 is a flowchart showing an operation in which the storage device 100 according to the embodiments of the present disclosure adaptively determines a method of writing data units DU.

Referring to FIG. 5, the controller 120 of the storage device 100 may calculate a first time as a time taken to receive M*K data units DU (S510).

The first time may be calculated as follows.

For example, the first time may be calculated as the sum of a time during which the M*K data units DU are inputted to the controller 120 from the host and a time during which a write command requesting to write the M*K data units DU is inputted to the controller 120.

For another example, the first time may be calculated as a time during which the M*K data units DU are inputted to the controller 120.

For still another example, the first time may be calculated as the sum of a time during which the M*K data units DU are inputted to the controller 120 from the host, a time during which a write command (not shown) requesting to write the M*K data units DU is inputted to the controller 120 and a time during which the inputted M*K data units DU are stored in the controller 120.

The controller 120 may compare the measured first time with a preset reference time. Specifically, the controller 120 may determine whether the first time is equal to or shorter than the reference time (S520).

When it is determined that the first time is equal to or shorter than the reference time (S520-Y), the controller 120 may determine, as a first method, a method of storing the M*K data units DU in the memory 110 (S530).

On the other hand, when it is determined that the first time is longer than the reference time (S520-N), the controller 120 may determine, as a second method, a method of storing the M*K data units DU in the memory 110 (S540).

Hereinafter, an operation in which the storage device 100 determines the above-described reference time will be described.

Figure 6:
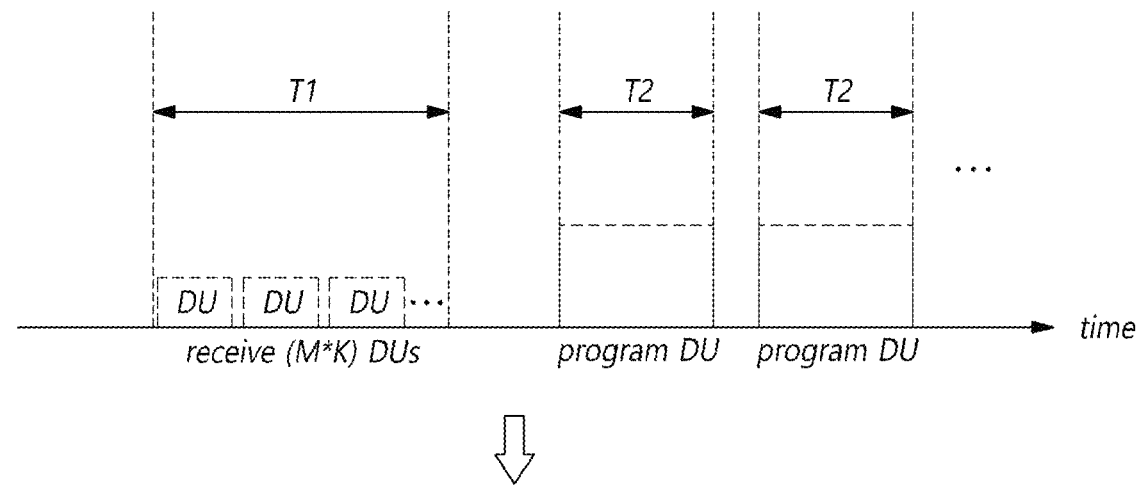
FIG. 6 is a diagram illustrating an operation in which the storage device according to the embodiments of the present disclosure determines a reference time.

FIG. 6 is a diagram illustrating an operation in which the storage device 100 according to the embodiments of the present disclosure determines a reference time.

Referring to FIG. 6, the controller 120 of the storage device 100 may measure a first time T1 as a time taken to receive M*K data units DU.

The controller 120 may determine the reference time based on at least one of a second time T2 as a time required to store a data unit DU of the M*K data units DU in the memory 110, and M as the number of memory dies included in the memory 110.

For example, the controller 120 may determine the reference time to be proportional to at least one of the second time T2 and M.

For another example, the controller 120 may determine the reference time as a time obtained by adding an additional time to a value proportional to at least one of the second time T2 and M. The additional time may be determined by an overhead that is caused while the controller 120 writes the data unit DU to the memory 110.

Hereinafter, specific examples of the first method and the second method described above with reference to FIG. 5 will be described.

Figure 7:
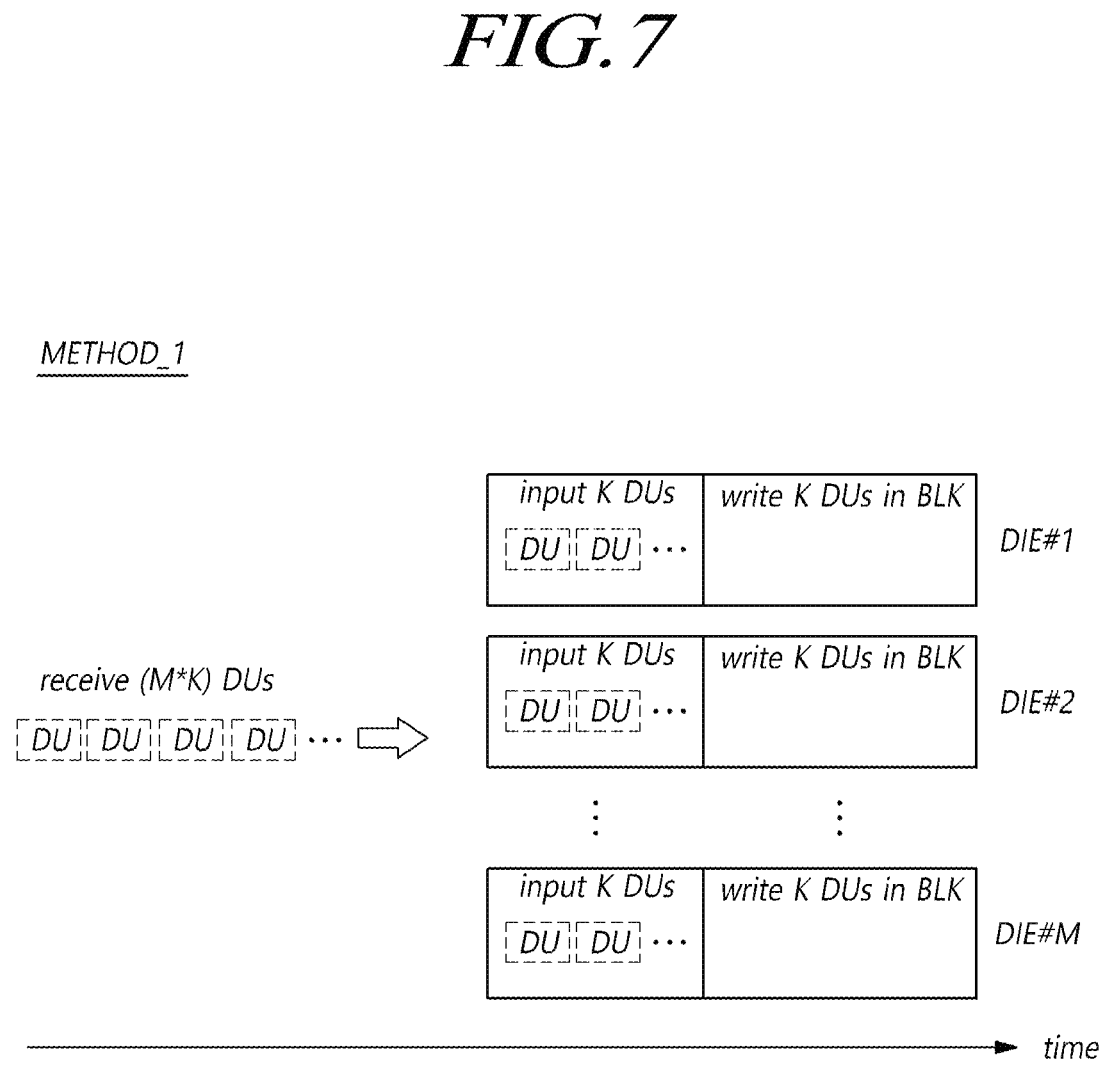

FIG. 7 is a diagram illustrating an operation in which the storage device 100 according to the embodiments of the present disclosure stores data units DU according to a first method.

Referring to FIG. 7, a first method METHOD_1 may be a method of simultaneously storing all M*K data units DU in M memory blocks BLK selected from the M memory dies DIE #1, DIE #2, . . . , DIE #M, respectively.

As shown in FIG. 7, K data units DU of the M*K data units DU may be written to each of the M memory blocks BLK. When using the first method METHOD_1, as the order in which the M*K data units DU are written is optimized in a full-interleaving scheme, the performance of subsequently reading the M*K data units DU may be optimized.

To which memory block BLK each of the M*K data units DU is to be written may be determined in various ways. To optimize read performance for the M*K data units DU, the controller 120 may determine to which memory block BLK each of the M*K data units DU is to be written.

For example, to receive the M*K data units DU, the controller 120 may receive M data units DU K times. M data units DU received I-th, where I is a natural number of K or less, may be stored in the I-th pages, respectively, of the M memory blocks BLK.

Hereunder, a case where each of the memory cells CELL included in the M memory blocks BLK is a TLC capable of storing 3 bits of data will be described.

In this case, M data units DU which are received first may be stored in first pages (e.g., LSB pages), respectively, of the M memory blocks BLK. M data units DU which are received second may be stored in second pages (e.g., CSB pages), respectively, of the M memory blocks BLK. M data units DU which are received third may be stored in third pages (e.g., MSB pages), respectively, of the M memory blocks BLK.

Figure 8:
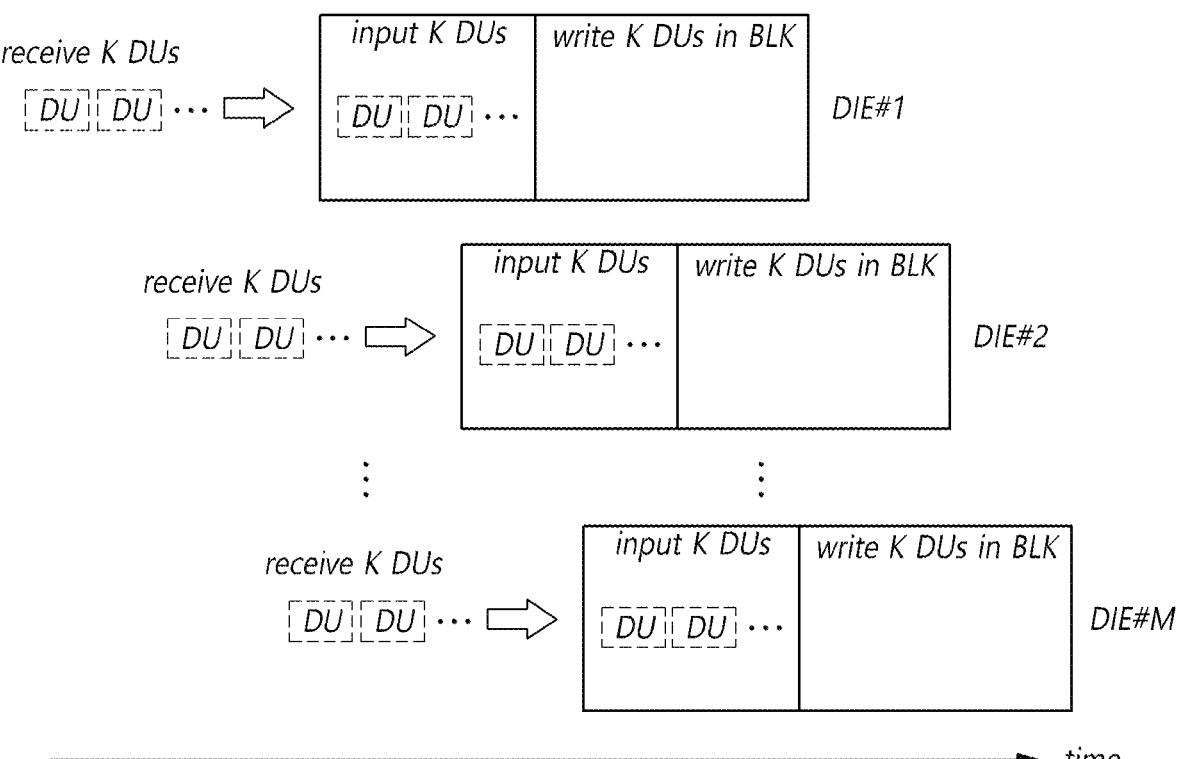
FIG. 8 is a diagram illustrating an operation in which the storage device according to the embodiments of the present disclosure stores data units according to a second method.

FIG. 8 is a diagram illustrating an operation in which the storage device 100 according to the embodiments of the present disclosure stores data units DU according to a second method.

Referring to FIG. 8, a second method METHOD_2 may be a method of storing K data units DU of the M*K data units DU at a time in memory blocks BLK of a memory die selected from the M memory dies DIE #1, DIE #2, . . . , DIE #M.

For example, among the M*K data units DU, K data units DU which are received first may be first stored in the memory die DIE #1. K data units DU which are received next may be stored in the memory die DIE #2.

This process may be performed until K data units DU which are received last are stored in the memory die DIE #M.

When using the second method METHOD_2, it is possible to prevent a time point at which a write operation on data units DU received earlier is started, from being delayed to after all M*K data units DU are received.

In addition, when using the second method METHOD_2, by quickly deleting in the controller 120 data units DU written earlier, a free space inside the controller 120 may be secured more quickly.

Figure 9:
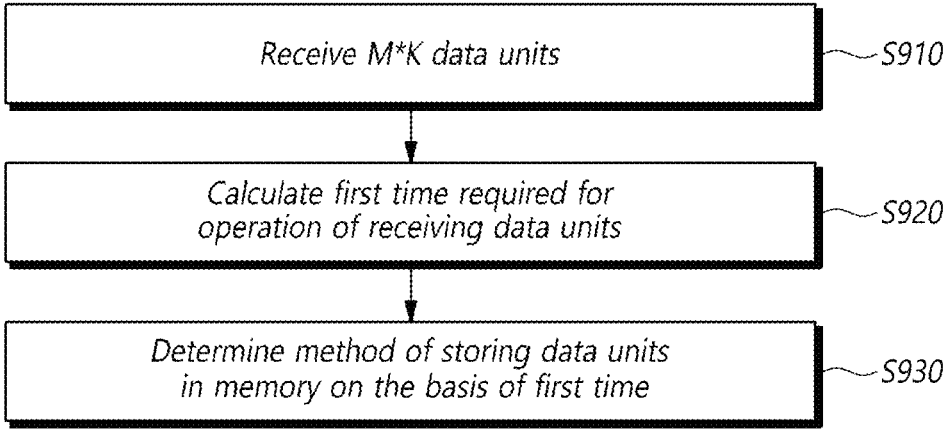
FIG. 9 is a diagram showing a method for operating a storage device according to embodiments of the present disclosure.

FIG. 9 is a diagram showing a method for operating the storage device 100 according to embodiments of the present disclosure.

Referring to FIG. 9, the method for operating the storage device 100 may include S910 of receiving M*K data units DU from the host.

The method for operating the storage device 100 may include S920 of calculating a first time T1 taken to receive the M*K data units DU.

The method for operating the storage device 100 may include S930 of determining a method of storing the M*K data units DU in the memory 110 based on the calculated first time T1.

For example, S930 may include comparing the first time T1 and a preset reference time; and determining the storing method as a first method when the first time T1 is equal to or shorter than the reference time, and determining the storing method as a second method when the first time T1 is longer than the reference time.

The operation S930 may further include determining the reference time based on at least one of a second time T2 required to store a data unit of the M*K data units DU in the memory 110 and M. For example, determining the reference time may determine the reference time to be proportional to at least one of the second time T2 and M.

As an example, the first method may be a method of simultaneously storing all M*K data units DU in M memory blocks BLK selected from the M memory dies DIE #1, DIE #2, . . . , DIE #M, respectively.

As an example, the second method may be a method of storing K data units DU of the M*K data units DU at a time in memory blocks BLK of a memory die selected from the M memory dies DIE #1, DIE #2, . . . , DIE #M.

Although embodiments of the present disclosure have been described for illustrative purposes, those skilled in the art will appreciate that various modifications, additions and substitutions are possible, without departing from the scope and spirit of the present disclosure. Therefore, the embodiments disclosed above and in the accompanying drawings should be considered in a descriptive sense only and not for limiting the technological scope. The technological scope of the present disclosure is not limited by the embodiments and the accompanying drawings. The spirit and scope of the present disclosure should be interpreted in connection with the appended claims and encompass all equivalents falling within the scope of the appended claims. Furthermore, the embodiments may be combined to form additional embodiments.

What is claimed is:

1. A storage device comprising:

a memory including M memory dies, each memory die including a plurality of memory blocks, each memory block including a plurality of memory cells, each memory cell storing K bits of data; and a controller configured to receive M*K data units from a host, calculate a first time taken to receive the M*K data units, and determine a scheme of storing the M*K data units in the memory based on the first time, wherein M is a natural number of 2 or more, wherein K is a natural number, wherein the controller compares the first time and a preset reference time, determines the scheme of storing the M*K data units in the memory as a first scheme when the first time is equal to or shorter than the reference time, and determines the scheme of storing the M*K data units in the memory as a second scheme when the first time is longer than the reference time, wherein, according to the first scheme, the controller is further configured to simultaneously store all M*K data units in M memory blocks selected from the M memory dies, respectively, and wherein, according to the second scheme, the controller is further configured to store K data units of the M*K data units at a time in memory blocks of a memory die selected from the M memory dies.

2. The storage device according to claim 1, wherein the controller determines the reference time based on at least one of a second time required to store a data unit of the M*K data units in the memory and the M.

3. The storage device according to claim 2, wherein the controller determines the reference time to be proportional to at least one of the second time and the M.

4. A method for operating a storage device, the method comprising:

receiving M*K data units from a host;

calculating a first time taken to receive the M*K data units; and determining a scheme of storing the M*K data units in a memory based on the first time, wherein the memory includes M memory dies, each memory die including a plurality of memory blocks, each memory block including a plurality of memory cells, each memory cell storing K bits of data, wherein M is a natural number of 2 or more, wherein K is a natural number, and wherein determining a scheme of storing comprises:

comparing the first time and a preset reference time; and determining the scheme of storing as a first scheme when the first time is equal to or shorter than the reference time, and determining the scheme of storing as a second scheme when the first time is longer than the reference time, wherein the method further comprises:

according to the first scheme, simultaneously storing all M*K data units in M memory blocks selected from the M memory dies, respectively; and according to the second scheme, storing K data units of the M*K data units at a time in memory blocks of a memory die selected from the M memory dies.

5. The method according to claim 4, wherein determining a scheme of storing further comprises:

determining the reference time based on at least one of a second time required to store a data unit of the M*K data units in the memory and the M.

6. The method according to claim 5, wherein the determining the reference time determines the reference time to be proportional to at least one of the second time and the M.

7. A storage device comprising:

a memory including M memory dies, each memory die including a plurality of memory blocks, each memory block including a plurality of memory cells, each memory cell storing K bits of data; and a controller configured to:

receive M*K data units from a host, select one of a simultaneous storing scheme and a sequential storing scheme based on a first time taken to receive the M*K data units, and store the M*K data units in the memory dies based on the selected storing scheme, wherein M is a natural number of 2 or more, and K is a natural number, wherein the controller is further configured to compare the first time with a reference time, wherein the controller is further configured to determine the scheme of storing the M*K data units in the memory as a first scheme when the first time is equal to or shorter than the reference time, and determine the scheme of storing the M*K data units in the memory as a second scheme when the first time is longer than the reference time, wherein, when it is determined that the first time is equal to or shorter than the reference time, the controller selects the simultaneous storing scheme, and simultaneously stores M data units of the M*K data units in the M memory dies according to the simultaneous storing scheme, and wherein, when it is determined that the first time is longer than the reference time, the controller selects the sequential storing scheme, and sequentially stores M data units of the M*K data units in the M memory dies according to the simultaneous storing scheme.

8. The storage device according to claim 7, wherein the controller determines the reference time based on at least one of a second time required to store one data unit of the M*K data units in the memory and the M.

* * * * *